Figure 1:
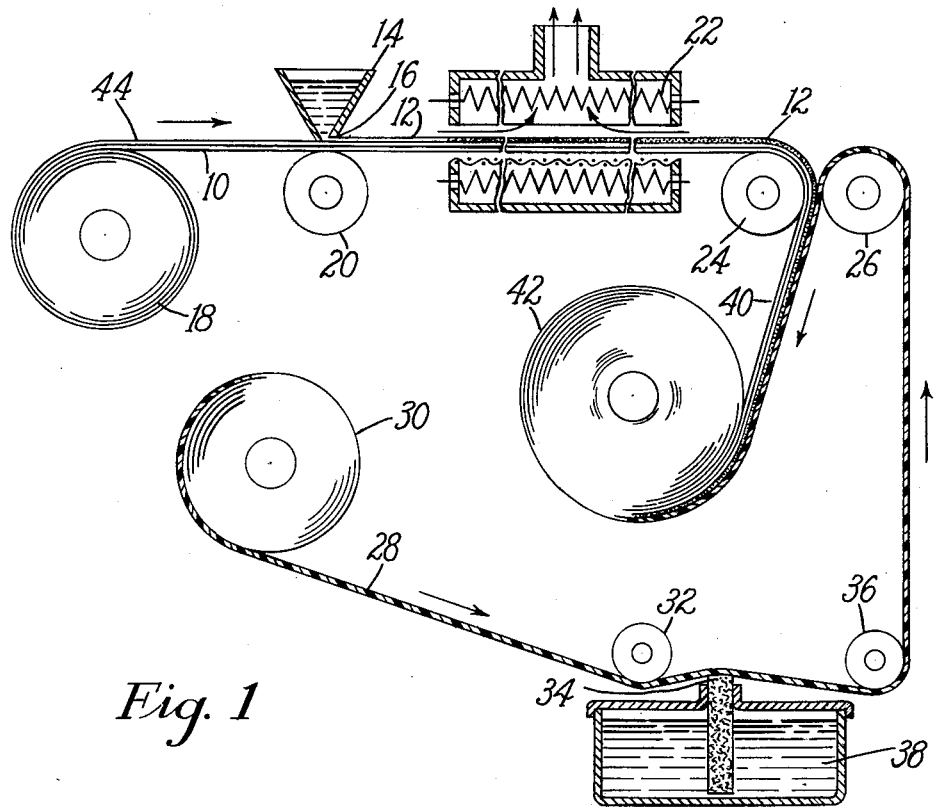

Inventor
Malcolm Seymour
By his Attorney 2,725,325
Patented Nov. 29, 1955

2,725,325

PROTECTED ADHESIVE PLASTIC SHEET MATERIALS AND METHODS OF MAKING THE SAME

Malcolm Seymour, North Andover, Mass., assignor to B. B. Chemical Co., Boston, Mass., a corporation of Massachusetts Application February 27, 1952, Serial No. 273,648

6 Claims. (Cl. 154—140)

This invention relates to protected adhesive plastic sheet material for reinforcing, repairing or bonding plastic sheet material and to a method for making the same.

Thin plastic sheet material, particularly polymerized vinyl resin flexible film, is being used increasingly in many fields because of its desirable appearance, strength and resistance to wear. In many of these uses, for example in inflatable objects such as cushions, play balls and in upholstery, the sheet material is subjected either constantly or intermittently to considerable tension. Breaks or tears in plastic sheet material subjected to tension rapidly develop in size because of the extremely low tear resistance of the material; and repair of such breaks or tears must be effected promptly to avoid irreparable damage. In general, when objects such as those above enumerated are perforated or cracked, it has not been possible to effect a satisfactory repair with equipment available in the home.

In a copending application of the present inventor entitled Supported Adhesive Strip Material, Serial No. 144,147, filed February 14, 1950, which issued as United States Letters Patent No. 2,681,877 on June 22, 1954, there is disclosed an adhesive sheet material wherein a thin sheet of flexible plastic sheet material formed in intimate clinging engagement with but not adhesively bonded to a fibrous supporting sheet, is provided with a film of activatable non-pressure sensitive adhesive, the adhesive being protected from contamination by a limp polythene sheet which is pressed onto the surface of the adhesive and held in place by atmospheric pressure, substantially all air having been squeezed out from between the polythene sheet and the layer of adhesive.

The adhesive employed in conjunction with the flexible plastic sheet material may be activatable by heat or by solvent. Pressure-sensitive adhesives are not effective for the permanent repair, bonding or decoration of flexible plastic sheet materials. The bond between pressure-sensitive adhesives and a plastic surface is not permanent nor is it strong enough to provide an effective repair or reinforcement. The holding power of pressure-sensitive adhesives is due primarily to physical engagement of the adhesive with the unevenness of a surface. The adhesive must be soft in order to conform to and grip the unevennesses of the surface to be bonded and because of this softness the pressure-sensitive adhesive bond loosens or slips under stress. The ingredients of this type of adhesive are usually nonpolar, that is, do not have polar groups to provide electrical forces to hold the adhesive on the surface.

On the other hand, adhesive films needed for permanent repair of sheet plastic are of the polar type and make use of the electrical attraction between the adhesive and the surface. This attraction is due to the charge distribution about the atomic groups in the components of the adhesive and is effective to form strong permanent bonds to plastic sheets of which the components include such polar groups as —Cl and —COOCH$_3$.

A further important factor is that thin flexible plastic sheets contain a substantial proportion of plasticizer and that this plasticizer tends to migrate to the adhesive film. In many instances migration of plasticizer will reduce an already soft pressure-sensitive adhesive to a "mush" with almost no holding power, while at the same time stiffening and embrittling the plastic sheet. The activatable adhesives are much firmer and less affected by the migration of plasticizer so that they are not rendered useless by plasticizer migration.

The plastic adhesive sheet material of my prior invention has been found very useful; but since the plastic sheet is formed on the carrier sheet, the exposed surface of the plastic adhesive sheet will be smooth. Also, the plastic sheet materials available in the above form are limited in variety.

It is desirable to provide adhesive plastic sheets of which the plastic is identical with or complementary to the plastic sheet of the upholstery or decoration, both for use in the initial construction and as a repair kit to accompany the upholstered or decorated article. This requirement imposes the necessity of preparing a small quantity of plastic adhesive sheet material for use with each special plastic sheet material. However, considerable expense is involved in preparing adhesive plastic sheet material of the type where the plastic is formed on a fibrous carrier in small quantities to meet the needs for bonding, repairing or reinforcing plastic sheets in the tremendous range of colors and surface characteristics encountered in commercial operations.

It is a feature of the present invention to provide a composite protected adhesive plastic sheet material, which may have either a plain or contoured exposed surface, and which is useful for the strong and permanent reinforcement, repair or bonding of plastic sheet material.

It is a further feature to provide a highly adaptable method for the manufacture of protected adhesive plastic sheet material by which large or small, uniform or varied portions of plastic sheet material may be formed into a protected adhesive plastic sheet material.

The protected adhesive plastic sheet material of the present invention is a thin activatable non-pressure sensitive adhesive film formed on and in intimate clinging engagement with, but not adhesively bonded to a non-stretchable, disposable supporting sheet, and thin plastic sheet material permanently united to the layer of adhesive. The composite plastic sheet and adhesive film constituting the adhesive plastic sheet material are held in smooth, unwrinkled condition on the surface of the disposable supporting sheet and are readily stripped from the supporting sheet for activation of the adhesive with a solvent and application to the surface of plastic sheet material to be bonded, repaired or reinforced to form a permanent bond therewith.

The method of the present invention involves the deposition on a smooth surfaced, disposable, non-stretchable supporting sheet of a uniform film of a solution of a non-pressure sensitive adhesive in a volatile organic solvent, the evaporation of the solvent from the adhesive film, and the combination of a plastic sheet with the adhesive film. No limits have been found as to the thinness of plastic sheet material useful in the method since the plastic sheet is not subjected to tension or extended solvent action which might be encountered in the application of adhesive to a surface of the plastic sheet. Furthermore, the method is peculiarly adapted to the continuous production of composite protected adhesive plastic sheet material since successive relatively short lengths of different plastic sheet materials having either plain or contoured surfaces may be joined to provide a continuous length which may be assembled with successive portions of a continuous strip of the supported adhesive in a continuous manner.

Figure 2:
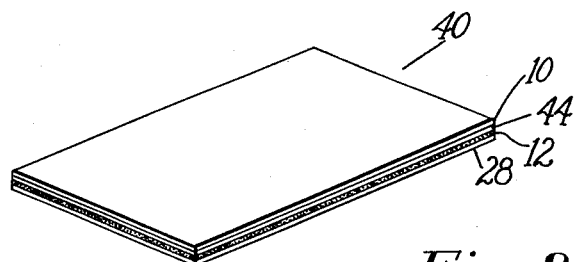
Figure 3:
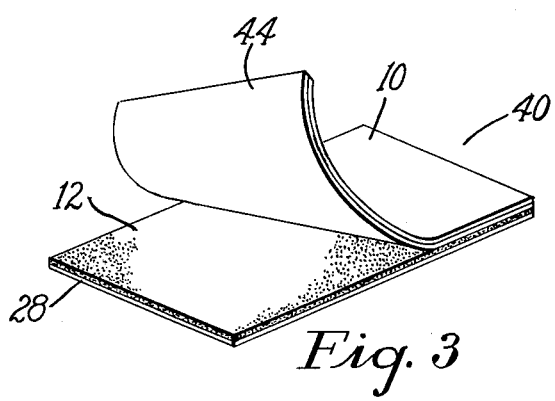

Reference is made to the drawings forming a part of the disclosure of the present invention in which, Fig. 1 is a diagrammatic side view illustrating the method of the invention;

Fig. 2 is an angular view of a composite protected adhesive plastic sheet material according to the present invention; and Fig. 3 is an angular view illustrating the separation of the supporting sheet from the adhesive plastic sheet prior to activation of the adhesive and use of the adhesive plastic sheet for binding, repairing or reinforcing.

In the illustrated method of the present invention a flexible, non-stretchable, fiber base supporting sheet 10 is coated on one surface with a film 12 of adhesive suitably by means of a trough 14 and knife edge 16 arrangement, as shown in Fig. 1, wherein the sheet material 10 from a roll 18 passes over a roll 20 beneath the trough 14 and knife edge 16 applicator and the supporting sheet 10 and layer of adhesive 12 are then passed through a drying oven indicated diagrammatically at 22, which oven is equipped with means (not shown) for circulating air through the oven. The supporting sheet with the dried film of adhesive thereon is then passed between the nip of rolls 24 and 26.

Plastic sheet material 28 from roll 30 is passed beneath roll 32 over the wick 34 and under the roll 36 and is lightly moistened with solvent from the closed trough 38 which serves to clean the surface of the plastic and to prepare it for combination with the dried adhesive film 12. The moistened plastic sheet 28 is then passed between the nip of the rolls 24 and 26 where it is pressed into intimate engagement with the dried adhesive film 12 and the combined supporting sheet 10 and adhesive film 12 and plastic sheet 28 constituting the protected adhesive plastic sheet material 40 are wound on a roll 42.

Suitable supporting sheets 10 include substantially non-stretchable, somewhat flexible, fiber base sheet materials which are not soluble in the solvent component of the adhesive nor in the plastic and/or plasticizer components of the adhesive applied to their surfaces and which present a smooth imperforate surface to which the adhesive film will cling but will not bond. The most satisfactory supporting sheet materials have been found to be relatively heavy kraft papers of which the surfaces are coated or impregnated with a firmly adherent layer 44 of plastic which covers all of the surface fibers. In particular, twenty to sixty-five pound kraft paper having a very thin coating layer of polyethylene plastic has been found very satisfactory.

The adhesive film 12 deposited on the exposed surface of the carrier sheet 10 is a volatile organic solvent solution of a non-pressure sensitive activatable adhesive composition. This adhesive may be activatable by both heat and solvent or solely by solvent or solely by heat. A preferred adhesive comprises a butadiene-acrylonitrile copolymer synthetic rubber having an acrylonitrile content of from 25% to 45% and a linear polymeric toughening agent which may be a vinyl chloride-vinyl acetate copolymer containing from 85% to 93% vinyl chloride, a chlorinated rubber having a chlorine content of approximately 67%, or mixtures of these. From 25 to 60 parts by weight of the linear polymeric toughener are employed with 100 parts by weight of the butadiene-acrylonitrile copolymer.

Ordinarily no difficulty is encountered due to softening of such non-pressure sensitive adhesives by migration of plasticizer from the plastic sheet into the adhesive film. However, in a preferred form any tendency of plasticizer to migrate into the adhesive is counteracted by compounding the adhesive to have satisfactory physical properties after evaporation of the solvent, while at the same time containing from 20% to 30% of plasticizer to set up an equilibrium with the plasticizer in the plastic sheet. A proportion of plasticizer is used which will eliminate difficulties due to plasticizer migration but in no instance is sufficient plasticizer employed to form a soft truly pressure-sensitive adhesive state.

The adhesive may be applied to the surface of the carrier sheet by any suitable method such as knife spreading, brushing, calendering, or other known procedure. Using a knife spreader, an 18% to 35% solids content volatile organic solvent solution of the adhesive is applied to the carrier sheet 10. Suitably, the coating 12 may be from 0.008 to 0.015 inch in wet thickness. The coating 12 is dried carefully to prevent formation of bubbles during the drying step in order to provide a continuous adhesive layer. The thickness of the adhesive coating 12 is not critical but it is important that a continuous coating be formed and ordinarily an adhesive coating of from .001 to .003 inch dry thickness is provided.

Plastic sheet materials 28 for combination with the adhesive film 12 on the carrier sheet 10 include commercially available waterproof ester-plasticized sheets of polymerized vinyl resinous materials including the vinyl chloride polymer resins, the vinyl chloride-vinyl acetate copolymer resins containing from 85% to 95% by weight of vinyl chloride, the vinyl chloride-vinylidene chloride copolymer resins, and other waterproof vinyl resins. For combination with adhesives of the type above discussed it has been found that an exceptional bonding action is obtained where these resin sheet materials may contain from about 20% to about 100% by weight of the resin of an ester plasticizer such as dioctyl phthalate, tricresyl phosphate, dibutyl phthalate and other known ester plasticizers. As noted, the adhesive film 12 is dry and non-tacky at the time of combination with the plastic sheet 28 and it appears that the ester plasticizer component is the effective agent in forming a strong permanent bond between the plastic sheet 28 and the dried film 12 of adhesive. This action is promoted by moistening the plastic sheet 28 with solvents such as methyl-ethyl ketone, or similar volatile ketonic solvents. Cleaning and moistening may be effected by any convenient means, the simple wiping of the surface with a solvent moistened wick 34 being merely for purposes of illustration. The action of the solvent is not an activation of the adhesive since solvent moistening of an unplasticized resin sheet will not be effective to secure the desired combination between a plastic sheet and the film of adhesive.

The composite protected adhesive sheet material 40 as shown more clearly in Figs. 2 and 3 comprises a dried, non-pressure sensitive film of adhesive formed on and in intimate clinging engagement with the polyethylene surface layer 44 of the fibrous supporting sheet 10 in a relation such that the adhesive will not separate from the polyethylene surface under ordinary handling. Plastic sheet material 28 is united to the adhesive film 12 in a permanent manner such that it is not possible to separate the adhesive film 12 from the plastic sheet 28 without destroying them. For use of the composite adhesive plastic sheet material 40, the supporting carrier sheet 10 with its layer 44 of polyethylene is peeled back from the adhesive film 12 and the adhesive film 12 is brushed, sprayed or otherwise treated with a volatile organic solvent to activate the adhesive. The activated adhesive film 12 may be then permanently secured to the surface of plastic sheet material to be reinforced, repaired or bonded, and will adhere thereto immediately. Upon evaporation of the solvent, a strong permanent bond is formed which will resist constant tension or sharp shocks and may be relied upon for the fabrication of such articles as upholstered furniture or the like.

The following example is given as of possible assistance in understanding the invention and it is to be understood that the example is to be regarded as illustrative only and that the invention is not limited to the details or specific procedures or proportions employed in the example except as defined in the appended claims.

*Example.*—An adhesive solution was prepared by forming an intimate mixture of 100 parts of a butadiene-acrylonitrile copolymer having 33% acrylonitrile content (Hycar OR–25 NS), 40 parts of a vinyl chloride-vinyl acetate copolymer having an 85% to 88% vinyl chloride content (Vinylite VYHH) and 28 parts of di-2-ethylhexyl phthalate and dissolving this mixture in a mixed solvent comprising 70 parts by volume of toluene and 30 parts by volume of methyl isobutyl ketone. This solution was brought to a 25% solids content by addition of further solvent mixture.

A sheet of 25 lb. kraft paper coated with polyethylene on one surface to a thickness which completely covered all surface fibers with a half mil of polyethylene above the fibers was passed through a knife spreader and a coating of 0.015" wet thickness of the adhesive solution was spread on the free surface of the vinyl resin sheet. The adhesive coating was dried by passing it slowly through an oven and circulating air past the coating at a temperature of 160° to 170° F., the time of passage of the adhesive coating through the oven being approximately six minutes. A dried adhesive coating approximately 0.003" in thickness was obtained.

A 10 mil thick sheet of vinyl resin copolymer of approximately 95% vinyl chloride and 15% vinyl acetate (Vinylite VYNW) plasticized with 43% by weight of the resin of di-2-ethylhexyl phosphate was passed over a felt wick moistened with the solvent mixture, and the wiped and moistened surface of the resin sheet was brought against the dried adhesive coating on the polyethylene coated kraft paper supporting sheet. The assembly was lightly pressed between rolls and thereafter wound on a spool.

It was observed that an initial bond was formed between the resin sheet and the dried adhesive coating and that this bond rapidly increased in strength so that at the end of 25 hours the dried adhesive coating and the resin sheet could not be separated without destruction. The adhesive film clung firmly to the polyethylene coating on the paper but was readily and cleanly separable by pulling the resin sheet away from the polyethylene coated paper.

For use of the supported adhesive plastic sheet for bonding of two pieces of a similar resin film, the polyethylene coated paper was stripped from the dried adhesive surface, and the dried adhesive was activated with a solvent comprising 20% by volume of cyclohexanone and 80% by volume of methyl ethyl ketone, care being taken that the solvent moistened portions of the adhesive did not come in contact. The solvent activated adhesive was then pressed against the edge portions of two sheets of a vinyl chloride-vinyl acetate copolymer resin sheet containing approximately 95% vinyl chloride, and was rolled into intimate contact by a hand roller. A strong bond was formed immediately which increased in strength to a point such that the adhesive resin sheet could not be stripped from the copolymer resin sheets without damage.

Having described my invention, what I claim as new and desire to secure by Letters Patent of the United States is:

1. A composite protected adhesive plastic sheet material comprising a thin, dry, activatable, substantially non-pressure sensitive film of an adhesive comprising a rubbery copolymer of butadiene and acrylonitrile and a resinous copolymer of vinyl chloride and vinyl acetate containing from 85% to 93% vinyl chloride in intimate clinging engagement with but not adhesively bonded to a flexible, non-stretchable, smooth surfaced, disposable paper supporting sheet, and a thin sheet of ester-plasticized waterproof vinyl polymer resin from the group consisting of polyvinyl chloride, vinyl chloride-vinyl acetate copolymer containing from 85% to 95% of vinyl chloride and vinyl chloride-vinylidene chloride copolymer resins united to the layer of adhesive through the action of the plasticizer.

2. A composite protected adhesive plastic sheet material comprising a thin, dry, activatable, substantially non-pressure sensitive film of an adhesive comprising a rubbery copolymer of butadiene and acrylonitrile and a copolymer of vinyl chloride and vinyl acetate containing from 85% to 93% vinyl chloride in intimate clinging engagement with but not adhesively bonded to a polyethylene coating on the surface of a flexible, non-stretchable, disposable fiber base supporting sheet, and a thin sheet of ester-plasticized resinous copolymer of vinyl chloride-vinyl acetate containing from 85% to 95% of vinyl chloride united to the layer of adhesive through the action of the plasticizer.

3. A composite protected adhesive plastic sheet material comprising a combination of a thin, dry, activatable, substantially non-pressure sensitive film of an adhesive comprising a rubbery copolymer of butadiene and acrylonitrile and a copolymer of vinyl chloride and vinyl acetate containing from 85% to 93% vinyl chloride, and from 20% to 30% based on the weight of said copolymers of an ester plasticizer in intimate clinging engagement with but not adhesively bonded to a polyethylene coating on the surface of a flexible, non-stretchable, disposable fiber base supporting sheet, and a thin sheet of ester-plasticized resinous copolymer of vinyl chloride and vinyl acetate containing from 85% to 95% of vinyl chloride sheet material united to the layer of adhesive through the action of the plasticizer.

4. A method for making a composite protected adhesive plastic sheet material comprising the steps of depositing a uniform film of a solution of an adhesive comprising a copolymer of vinyl chloride and vinyl acetate containing from 85% to 93% of vinyl chloride and a rubbery copolymer of butadiene and acrylonitrile in a volatile organic solvent on a flexible, non-stretchable, smooth surfaced disposable paper supporting sheet to which coating said adhesive when dry will cling but not adhesively bond, volatilizing the solvent from said film of adhesive, moistening with a volatile organic solvent a surface of a thin sheet of ester plasticized waterproof vinyl polymer resin from the group consisting of polyvinyl chloride, vinyl chloride-vinyl acetate copolymer containing from 85% to 95% of vinyl chloride and vinyl chloride-vinylidene chloride copolymer, and pressing the solvent moistened surface of said resin sheet against the dried adhesive film to effect a permanent union between said sheet of resin and said film of adhesive through the action of the plasticizer.

5. A method for making a composite protected adhesive plastic sheet material comprising the steps of depositing a uniform film of a solution of an adhesive comprising a copolymer of vinyl chloride and vinyl acetate containing from 85% to 93% of vinyl chloride and a rubbery copolymer of butadiene and acrylonitrile in a volatile organic solvent on a smooth surfaced polyethylene coating on a non-stretchable, flexible, disposable, fiber base supporting sheet to which coating said adhesive when dry will cling but not adhesively bond, volatilizing the solvent from said film of adhesive, moistening with a volatile organic solvent a surface of a thin sheet of ester-plasticized resinous copolymer of vinyl chloride and vinyl acetate containing from 85% to 95% of vinyl chloride, and pressing the solvent moistened surface of said resin sheet against the dried adhesive film to effect a permanent union between said sheet of resin and said film of adhesive through the action of the plasticizer.

6. A continuous method for making a composite protected adhesive plastic sheet material comprising the steps of depositing a uniform film of a solution in a volatile organic solvent of an adhesive comprising a copolymer of vinyl chloride and vinyl acetate containing from 85% to 93% of vinyl chloride, a rubbery copolymer of butadiene and acrylonitrile and from 20% to 30% based on the weight of said copolymers of an ester plasticizer on a smooth surfaced polyethylene coating on a non-stretchable, flexible, disposable fiber base supporting sheet to which coating said adhesive when dry will cling but not adhesively bond, volatilizing the solvent from said film of adhesive, moistening with a volatile organic solvent a surface of a thin sheet of ester-plasticized resinous copolymer of vinyl chloride and vinyl acetate containing from 85% to 95% of vinyl chloride, and pressing the solvent treated surface of said resin sheet against the dried adhesive film to effect a permanent union between said sheet of resin and said film of adhesive through the action of the plasticizer.

References Cited in the file of this patent

UNITED STATES PATENTS

| | | |
|---|---|---|
| 2,323,562 | Nugent | July 6, 1943 |
| 2,394,701 | Laws | Feb. 12, 1946 |
| 2,427,519 | Blyler | Sept. 16, 1947 |
| 2,558,804 | Wittgren | July 3, 1951 |
| 2,578,150 | Rathke | Dec. 11, 1951 |